United States Patent
Miller et al.

(10) Patent No.: US 8,025,834 B2
(45) Date of Patent: Sep. 27, 2011

(54) PROCESS AND APPARATUS FOR MOLDING CONTINUOUS-FIBER COMPOSITE ARTICLES

(75) Inventors: Alan K. Miller, Santa Cruz, CA (US);
Stephen L. Bailey, Los Gatos, CA (US);
Theodore Rosario, Jr., San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 113 days.

(21) Appl. No.: 12/484,779

(22) Filed: Jun. 15, 2009

(65) Prior Publication Data

US 2009/0309271 A1 Dec. 17, 2009

Related U.S. Application Data

(60) Provisional application No. 61/061,204, filed on Jun. 13, 2008.

(51) Int. Cl.
*B29C 39/42* (2006.01)

(52) U.S. Cl. ........ 264/557; 264/546; 264/561; 264/562; 264/563

(58) Field of Classification Search ............... 264/563, 264/557, 561, 562, 546
See application file for complete search history.

(56) References Cited

U.S. PATENT DOCUMENTS

| | | | |
|---|---|---|---|
| 2,766,160 A | 10/1956 | Bentov | |
| 3,033,730 A | 5/1962 | Martin | |
| 3,067,803 A * | 12/1962 | Fleury | 156/431 |
| 3,130,104 A | 4/1964 | Lewis et al. | |
| 3,769,127 A | 10/1973 | Goldsworthy et al. | |
| 3,855,031 A | 12/1974 | McNeely et al. | |
| 3,975,479 A | 8/1976 | McClean | |
| 4,558,971 A | 12/1985 | David | |
| 4,830,809 A * | 5/1989 | Liebl et al. | 264/257 |
| 6,899,842 B1 | 5/2005 | Corre et al. | |

FOREIGN PATENT DOCUMENTS

| | | |
|---|---|---|
| FR | 707101 A | 7/1931 |
| GB | 790639 | 2/1958 |
| GB | 1453936 | 10/1976 |

OTHER PUBLICATIONS

Fregosi, Alberto, "PCT Application No. PCT/US2009/047388 International Search Report Feb. 15, 2010", , Publisher: PCT, Published in: PCT.
Fregosi, Alberto, "PCT Application No. PCT/US2009/047388 International Preliminary Report on Patentability Oct. 21, 2010", , Publisher: PCT, Published in: PCT.
"Resin Transfer Molding and Structural Reaction Injection Molding", "ASM Handbook—Composites XP002552279", 2001, pp. 492-500, vol. 21, Publisher: ASM International, Published in: US.
"PCT Application No. PCT/US2009/047388 Partial Search Report Nov. 20, 2009", , Publisher: EPO, Published in: PCT.

* cited by examiner

*Primary Examiner* — Yogendra Gupta
*Assistant Examiner* — Alison Hindenlang
(74) *Attorney, Agent, or Firm* — DeMont & Breyer, LLC

(57) ABSTRACT

A process and apparatus for multi-shot, liquid-resin-molding of continuous-fiber composite articles is disclosed. The process involves the step-wise fabrication of an article wherein continuity of the fibers is maintained between the multiple workpieces of the finished composite article.

17 Claims, 11 Drawing Sheets

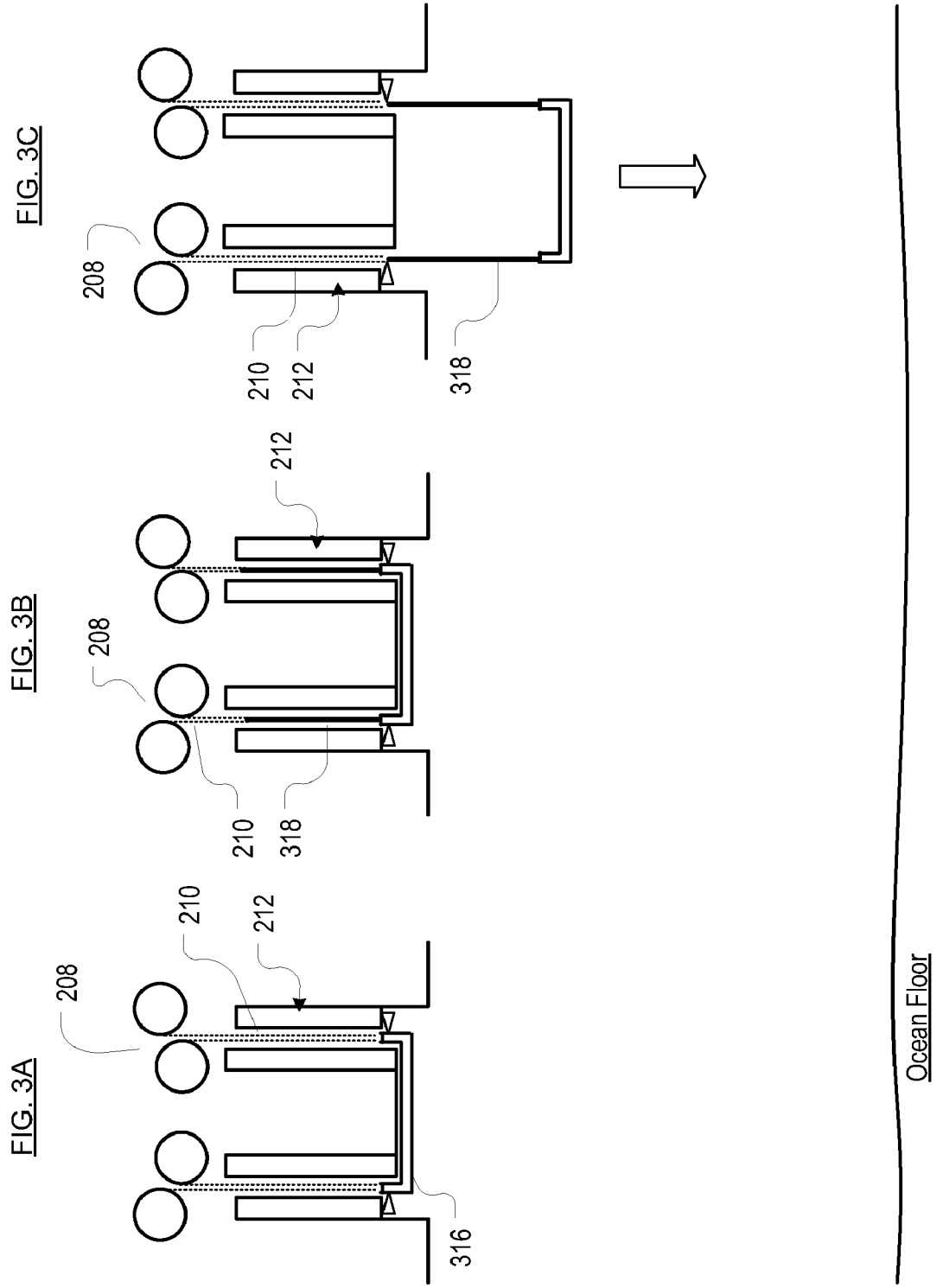

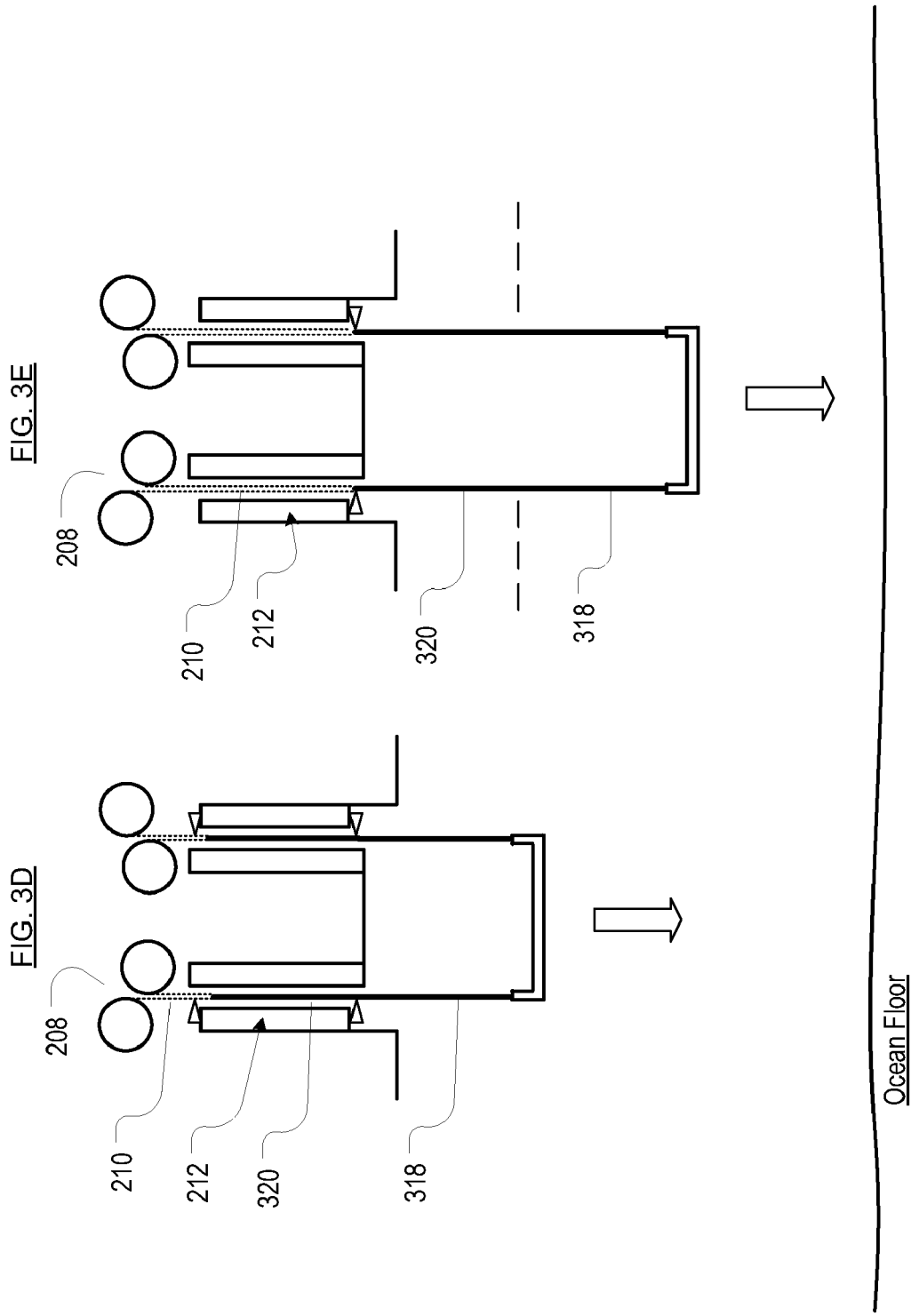

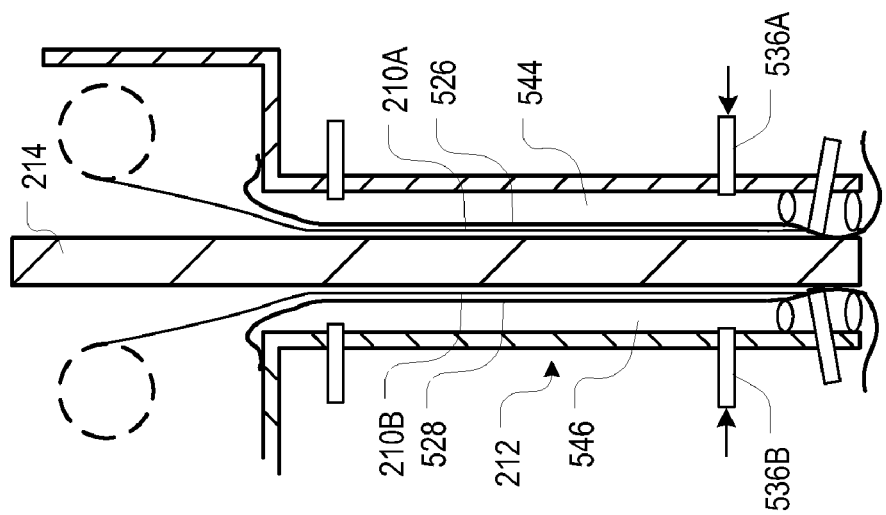
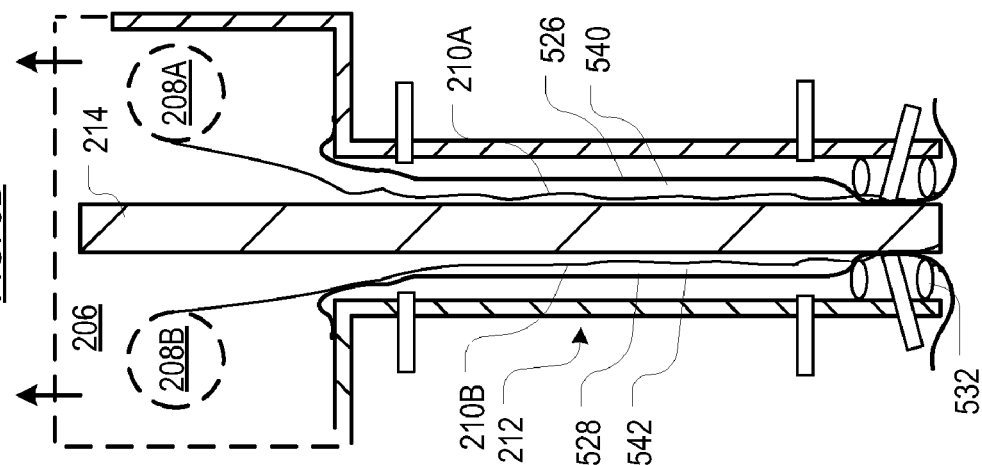
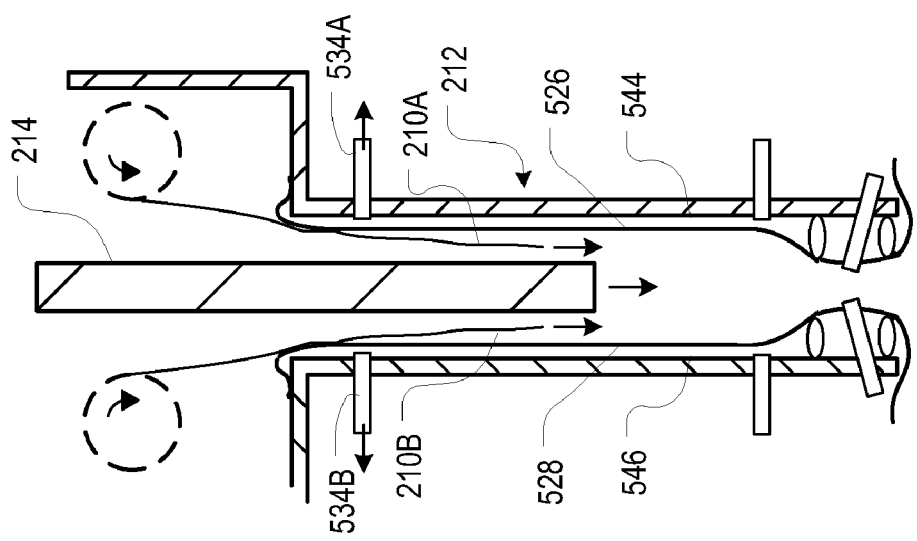

US 8,025,834 B2

PROCESS AND APPARATUS FOR MOLDING CONTINUOUS-FIBER COMPOSITE ARTICLES

STATEMENT OF RELATED CASES

This case claims priority of U.S. Provisional Patent Application Ser. No. 61/061,204 filed Jun. 13, 2008, which is incorporated herein.

FIELD OF THE INVENTION

The present invention relates to the production of long-length, continuous-fiber composite materials and structures.

BACKGROUND OF THE INVENTION

There is growing interest in Ocean Thermal Energy Conversion ("OTEC") systems as a means of carbon-free electric power generation. OTEC systems exploit the temperature difference between the warm surface waters of tropical seas and the cold waters of the deep ocean to generate electricity.

An OTEC system, such as closed-loop OTEC system 100 depicted in FIG. 1, usually resides on floating platform, ship, or barge 102. Key components of system 100 include closed-loop conduit 104, evaporator 106, warm water pipe 108, turbo-generator(s) 110, condenser 112, and cold water pipe 116.

Closed-loop conduit 104 contains working fluid 103, such as ammonia, etc. In operation, the liquid working fluid is pumped to evaporator 106. Warm surface water is also conducted to the evaporator via warm water pipe 108. Heat transferred from the water vaporizes the low-boiling point working fluid.

The vaporized working fluid flows to turbo-generator 110, where it is used to rotate a turbine. The turbine, in turn, drives an electrical generator to produce electrical energy. After the vaporized working fluid transits turbo-generator 110, it is condensed in condenser 112. Condensation is effected using cold sea water piped up from the deep ocean via cold water pipe 116. The now-liquid working fluid is pumped to evaporator 106 via pump 114 and the cycle continues.

Although conceptually quite simple, an OTEC system presents certain manufacturing challenges. Consider, for example, cold water pipe 116. To retrieve cold water, the cold water pipe extends vertically downward into the ocean about 1000 meters or more. As a consequence of the small temperature differential between the cold and warm waters that drives the OTEC process, this pipe must convey an exceedingly large quantity of water to the condenser to meet its duty requirements. Consequently, in addition to its extraordinary length, the cold water pipe must have a very large diameter. In fact, for a commercial-scale plant, the cold water pipe is likely to have a diameter of about 30 feet. To fabricate, transport, and install such pipe is a substantial undertaking.

Due to certain advantageous properties compared to metals (e.g., lighter weight, greater strain tolerance, better corrosion resistance, etc.) a polymer-matrix continuous-fiber composite material is potentially a good material from which to fabricate the cold water pipe. A variety of processes are available for producing suitable composite materials.

At 1000 meters or more in length, an OTEC cold water pipe is far too long to be molded all at once (i.e., "in one shot") in a single production operation. Rather, if made by ordinary methods, the cold water pipe would be formed as discrete lengths of pipe by molding a plurality of discrete, shorter pipe sections that are then connected by mechanical joints or adhesive bonding. Examples of other pipe-like items that are typically fabricated as a plurality of discrete lengths joined together mechanically include smokestacks, tunnel liners, and previous attempts to create OTEC cold water pipes in smaller-scale work.

Although discrete lengths can be used to form the cold water pipe, the resulting joints are not as strong as if the laminate were continuous across the joints. In other words, the pipe would be stronger if there were no joints. And these joints exhibit other disadvantages as well, including increased weight, complexity, and lower reliability than the basic composite material. Furthermore, there is considerable difficulty and expense to transporting 1000 meters worth of 30-foot diameter pipe over land and water to its destination (i.e., the floating platform). And that is the case regardless of whether the pipe is transported as a plurality of discrete segments that are to be assembled at the floating platform or whether they are preassembled and transported as a single (exceedingly long) unit that must then be "upended" into vertical position and attached to the platform.

The fabrication of an OTEC cold water pipe is therefore a challenging task for which no satisfactory approach currently exists.

SUMMARY OF THE INVENTION

The current invention provides an apparatus and process to mold very long and very large-diameter articles without some of the costs and disadvantages of the prior art. In particular, and among other advantages, the present method facilitates the fabrication of very long articles on-site, in a series of molding shots on the same article, yet maintains complete continuity of fibers and fiber geometry across the shots within the primary load-bearing portions of the article. As a consequence, although produced as a series of shots, the finished article nevertheless possesses advantageous characteristics of a one-shot molded article.

In the illustrative embodiment, the apparatus and processes disclosed herein are used to fabricate an OTEC cold water pipe. The fabrication takes place on-site, on a floating ocean platform. In some embodiments, that platform becomes the surface portion of the OTEC plant. This approach eliminates the need to handle and transport what would otherwise be many sections of bulky hollow pipe. Rather, and to great advantage, the process requires the transport of only the raw fabric (e.g., fiberglass, etc.), resin, and discrete-length pultruded core "planks," all in compact form, to the field location (e.g., platform, barge, etc.).

For lowest fabrication time and cost, it is desirable to limit the number of molding shots for forming the article (e.g., cold water pipe, etc.). But the fewer the number of shots, the longer the length of pipe molded per shot. The required height of the working area where the pipe is molded is a function, of course, of this unit pipe length.

When forming relatively large composite articles, such as an OTEC cold water pipe, a preformed material might be used as an element of the composite, such as a starting "core" that defines the shape of the eventual article. As a consequence, the preformed material must be transported to the site where the article is to be molded. The inventors recognized that in such a circumstance, an acceptable limit on the length molded per shot is based on the length of a standard shipping container, since the container will be used to transport the sections (hereinafter "planks") of "core." The length of a standard shipping container is forty feet. Assuming a maximum length of about 40 feet per section, 75 shots would be required to mold a 3000-foot pipe. Using the method and apparatus disclosed herein, 75 shots would take about two months to complete; this is not considered to be unreasonable.

A number of composite manufacturing processes are potentially available for stepwise molding of an OTEC cold water pipe or other extremely long articles. Most of such processes, including autoclave molding, filament winding, wet layup, sprayup, to name a few, have major disadvantages for this application and were ruled out by the inventors. On the other hand, the inventors recognized that "Liquid Resin Molding" processes might be suitable for molding very long and wide continuous-fiber composite articles.

One liquid resin molding process is Resin Transfer Molding ("RTM"). RTM uses a closed-cavity mold which is solid on all sides. In the simplest version of RTM, air is left in the fabric before resin injection. Some, but not all of this air is driven out through vents as the fabric fills with resin. In order to obtain an acceptable void content in the presence of this residual air, a very high pressure (about 275 psig) is sometimes applied while the resin is curing. The intent of the applied pressure is to shrink the size of any remaining air voids to acceptable levels. This large internal pressure generates substantial forces that tend to push opposing mold surfaces apart. For small molds, this problem is addressed using relatively inexpensive presses. But this approach becomes impractically expensive when dealing with large molds.

Another Liquid Resin Process is Vacuum-Assisted Resin Transfer Molding ("VARTM"). VARTM uses one-sided tooling. The term "tool(ing)," as used in this specification and the appended claims, refers to a solid entity/surface against which the composite material is molded and forms the shape of the molded article as the liquid resin transforms into a solid. The tool retains the liquid resin on one side of the article being molded and a vacuum bag retains the liquid resin on the other side of the article. In all known applications of VARTM, a gas, generally ordinary atmospheric-pressure air or in some cases high-pressure gas, lies on the outside of the vacuum bag.

During any one "shot," all of the resin being processed in the molding region is in liquid form. Accordingly, for tall workpieces, there will be a substantial gradient of hydrostatic pressure in the resin. Specifically, if the internal absolute pressure at the top of the molding region is zero (the minimum possible), then the internal pressure within the vacuum bag at the bottom of the molding region will be some pressure greater than zero (as a function of the resin's specific gravity and the height of the molding region). If the product of the height of the workpiece and the density of the resin is such that the hydrostatic pressure at the bottom of the workpiece is greater than one atmosphere, the vacuum bag will billow outward, rendering it useless for properly containing the resin.

Since the density of the liquid resin is similar to water (about 1 g/cc) the aforementioned effect places an absolute limit of about 33 feet on the height of a workpiece that can be made by VARTM. At 33 feet there would, however, be one atmosphere compaction pressure on the composite laminate at the top of the workpiece and zero compaction pressure at the bottom. This would produce very non-uniform laminate properties, such as, for example, fiber volume fraction. This second effect limits the practical working heights for a single "shot" of VARTM to about 15 feet. To fabricate a cold water pipe having a length of 3000 feet would require an unacceptably high 200 shots, if each shot produced a pipe section having a length of only 15 feet.

Available molding processes prior to the present invention were therefore poorly suited for the production of very long and very wide composite articles. To address the inadequacy of prior-art processes, the inventors developed a new type of Resin Transfer Molding that incorporates some aspects of VARTM.

In accordance with the illustrative embodiment, an apparatus for molding very long and very wide continuous-fiber composite articles includes a molding region that has a fixed hard outer surface, a fixed hard inner surface, an outer soft tool and an inner soft tool disposed between the inner and outer hard surfaces, a liquid delivery system, a resin delivery system, and vacuum system(s). Both the inner and outer soft tools comprise a resilient material, such as silicone rubber sheet commonly used in molding composite articles. A plurality of fabric rolls are disposed in a fiber supply region that is disposed above the molding region.

To facilitate the positioning of fabric within the molding region, a vacuum is drawn "behind" the inner soft tool and the outer soft tool (i.e., in the region between the soft tool and the nearest hard surface). The vacuum causes the inner soft tool to move toward the hard inner surface and the outer soft tool to move toward the hard outer surface. Fabric from the rolls is then fed into the molding region, along with a core material. The core material forms the core of a "sandwich" pipe wall and the fabric forms the face sheets of that sandwich. Specifically, fabric is disposed between the inner soft tool and the core, and fabric is also disposed between the outer soft tool and the core. In some embodiments, a resin distribution material (to assist in spreading the resin throughout the fabric) is pulled into the molding region along with the fabric.

After the fabric and core are in place in the molding region, the vacuum established behind the soft tools is released. An inner and outer vacuum seal are activated at the bottom of the molding region to seal the soft tools to that portion of the workpiece that has already been formed during a previous molding operation (i.e., a previous shot). A vacuum is developed on the "other" side of the soft tools (where the still-dry fabric is disposed) to withdraw air from the fabric in the molding region, which minimizes the void content of the resulting laminate. To avoid having to create a gas-tight seal between the fiber supply region and the molding region (over the dry, porous fabric, where creating such a seal would be particularly difficult or perhaps even impossible), the fiber supply region, as well as the molding region, are in fluidic communication with one another and are both placed under vacuum.

The fabric is then compacted against the core by, in the illustrative embodiment, adding liquid behind the inner and outer soft tool. Resin is then introduced to the fabric side of the soft tools. The vacuum is maintained on the fabric side of the soft tools while liquid is maintained behind the soft tools. Resin distributes throughout the fabric, rising to a predetermined height (as a function of the quantity of resin added) that does not exceed the region over which compaction is being applied. Pressure is maintained behind the soft tools during resin cure.

In some embodiments, initial cure of the resin to a self-supporting solid is performed at ambient temperature for a period of time in the range of about one to five hours. In some embodiments, as desired, the cured resin is "post cured," by further heating the resin to achieve a greater amount of cross linking (of the polymer), thereby maximizing corrosion (i.e., general chemical attack of the resin) resistance of the final article. In this regard, since an article such as a cold water pipe might be required to last 50 years unattended under water, a resin that is suitable for aggressive environments is advantageously selected for use. One such resin is a vinyl ester resin, such as Derakane 8084, which is commercially available from Ashland Inc. of Covington, Ky. In conjunction with the teachings of this specification, those skilled in the art will be able to select a resin suitable for use with the apparatus and methods disclosed herein, as a function of the intended application.

After the resin cures, pressure behind the soft tools is released and vacuum is applied to draw the soft tools toward the hard inner and outer surfaces and away from the cured laminate.

Once the curing is complete, the lower seal of the molding region is released and the brakes on the fabric rolls are released. The workpiece moves downward out of the molding region under the control of a gripping and translating device that lies underneath the molding region and grips the previously cured portion securely. In the illustrative embodiment, the article being formed is a cold water pipe for an OTEC plant and the molding apparatus is situated on a floating platform that will be the site of an OTEC plant. As a consequence, when the workpiece is released, it moves downward into the ocean.

Since there is continuity of fiber between the workpiece and the rolls of fabric, as the workpiece moves downward out of the molding region, fabric is drawn into the molding region. Additional core material is positioned in the molding region and the process is re-run to form a second workpiece. The second workpiece has continuity of fiber with the first workpiece as well as the fiber on the rolls. The process is repeated until the "growing" article reaches its desired length.

BRIEF DESCRIPTION OF THE DRAWINGS

FIGS. 3A through 3E depict the fabrication of a continuous-fiber composite article using the apparatus of FIG. 2 and in accordance with the illustrative embodiment of the present invention.

FIGS. 8A through 8F depict further detail of the fabrication of a continuous-fiber composite article using the apparatus of FIG. 2 and in accordance with the illustrative embodiment of the present invention.

DETAILED DESCRIPTION

Definitions. The terms appearing below are provided with the follow explicit definitions for use in this description and the appended claims.

Continuous-fiber composite means a fiber composite in which fibers are continuous throughout that the composite, as opposed to being chopped or short (i.e., discontinuous).

Shot refers to the amount of resin that is required to fill a mold cavity. A "multi-shot" article requires multiple, sequential resin fills and cures within the mold cavity.

Workpiece means the structure that is produced or the assemblage (e.g., core, fiber, resin) that will form that structure in a single shot in the molding region. In the context of multi-shot articles, the workpiece therefore represents a portion or segment of the final composite article (e.g., a segment of the cold water pipe, etc).

Continuity of fiber means that there is no discontinuity or break in fibers between the workpieces that compose a multi-shot composite article. To achieve this means that there must be no discontinuity in fibers between:
   fiber in a supply region and fiber in the molding region of an apparatus for molding composite articles, before or after resin is introduced to the molding region;
   fiber in the molding region, either before or after resin is introduced, and a workpiece; and
   fiber in the supply region and a workpiece.

Multi-shot continuous-fiber composite articles in accordance with the illustrative embodiment of the present invention will exhibit continuity of fiber throughout the multi-shot article.

Figure 1:
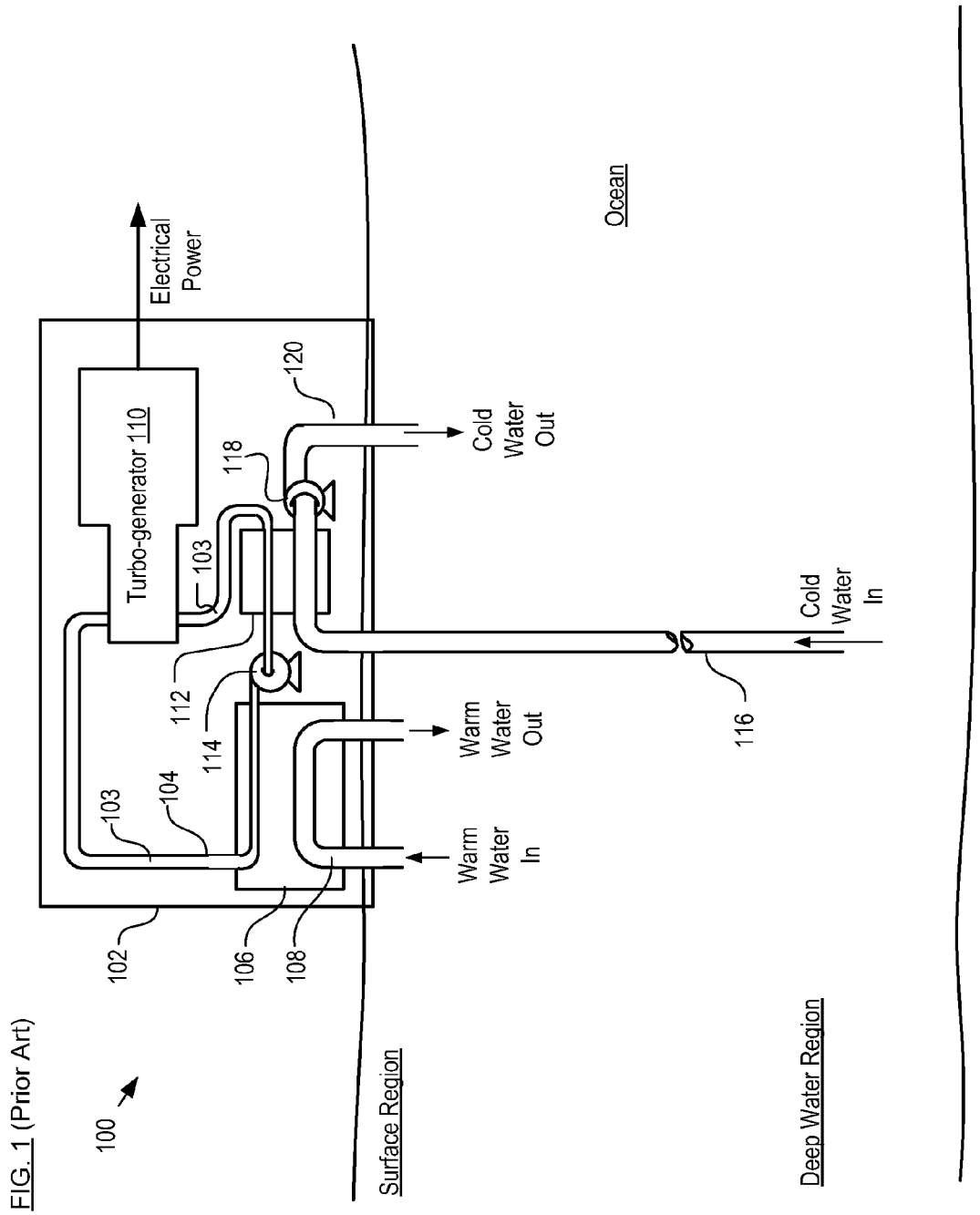
FIG. 1 depicts a conventional OTEC plant.
Figure 2:
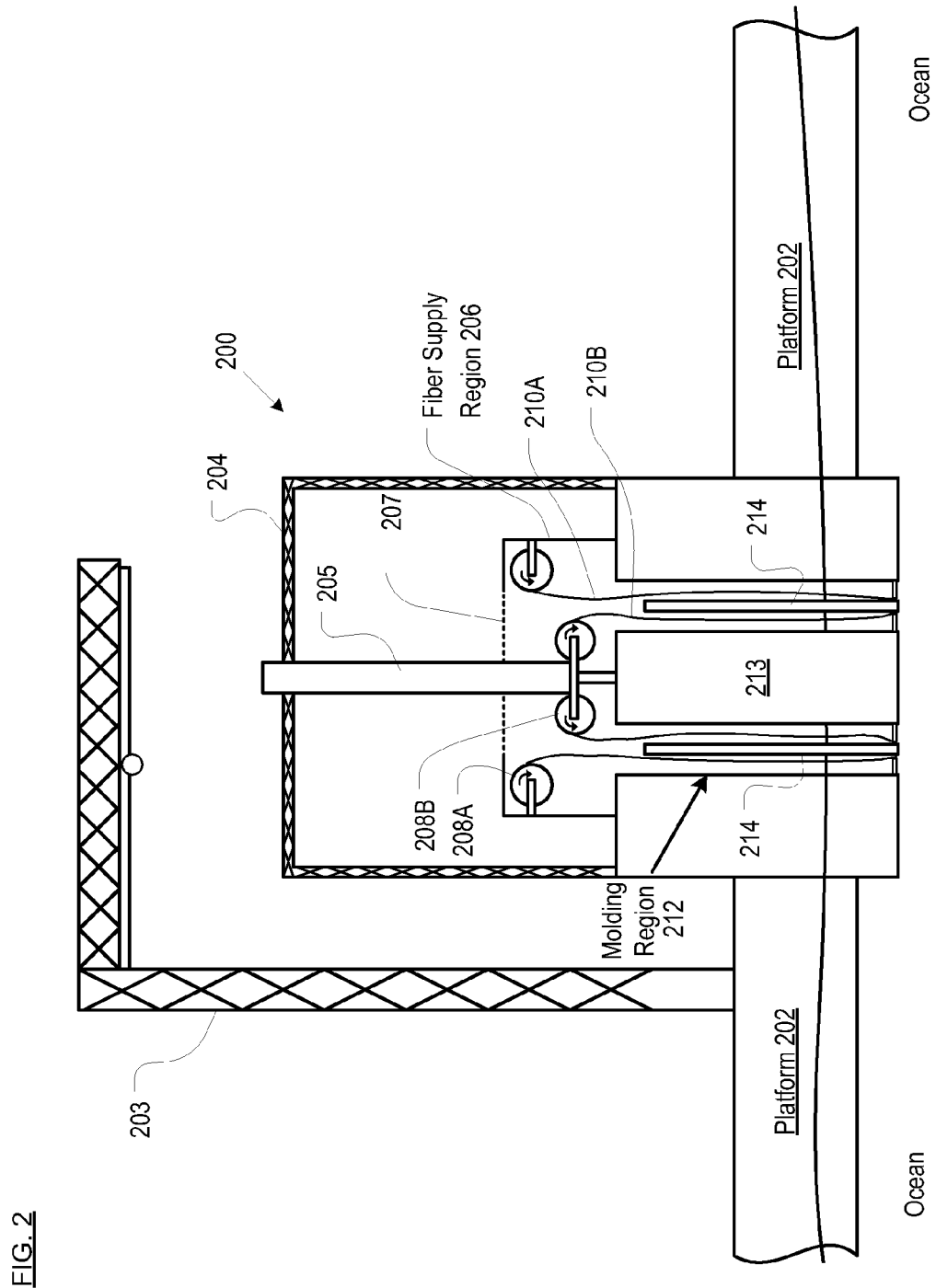
FIG. 2 depicts an apparatus for making continuous-fiber composite articles in accordance with the illustrative embodiment of the present invention.

FIG. 2 depicts a simplified side cut-away view of apparatus 200 in accordance with the illustrative embodiment of the present invention. In the illustrative embodiment described herein and depicted in the appended drawings, apparatus 200 is used to fabricate a cold water pipe for an OTEC plant (see, e.g., FIG. 1, cold water pipe 116). Apparatus 200 is more generally suitable for fabricating continuous-fiber composite articles and is uniquely well suited for fabricating multi-shot, continuous-fiber composite articles, especially those that are very wide and very tall, such as the aforementioned OTEC cold water pipe, a smokestack, etc.

In the illustrative embodiment, apparatus 200 is disposed on floating platform 202, which, in some embodiments, ultimately serves as a part of an OTEC plant (see, e.g., FIG. 1, platform 102). Apparatus 200 is oriented vertically on platform 202; that is, the axial (as opposed to radial) direction of a workpiece produced via apparatus 200 is vertically aligned.

Apparatus 200 comprises fiber supply region 206 and molding region 212. Fiber supply region 206 provides a continuous supply of fiber to the molding region. The fiber used in continuous-fiber composite materials is typically available in a variety of forms, including uni-directional tapes of various widths, plain weave fabric, harness satin fabric, braided fabric, and stitched fabric. Commonly-used fibers include, without limitation, fiber glass, commercially available from Owens Corning Technical fabrics, PPG, AGY and carbon fiber, commercially available from Zoltek and others. For use in conjunction with the present invention, the fiber is typically in the form of a fabric, provided in a convenient width as a function of the intended cross-sectional shape and size of the article (e.g., 1 to 2 meters width for a 10-meter diameter pipe, etc.). Such fabrics as fiberglass are, and as carbon fibers from Zoltek and others.

Fiber supply region 206 and molding region 212 are environmentally isolatable, collectively, from the other regions of apparatus 200. This is illustrated by notional access-way 207 in fiber supply region 206 and a seal at the bottom of molding region 212. The access-way is required to enable core 214, discussed further below, to be inserted into molding region 212.

In the illustrative embodiment, fiber in the form of fabric 210A and 210B (collectively "fabric 210") is disposed on respective rolls 208A and 208B (collectively "rolls 208"). Rolls 208A and fabric 210A are disposed radially-outward of rolls 208B and fabric 208B. In the illustrative embodiment, there is no difference in material type between fabric 210A and 210B. In accordance with the present invention, continuity of fiber is maintained between fabric 210 in supply region 206 and fabric 210 that has been fed to molding region 212.

The inner portions of apparatus 200, such as inner fabric rolls 208B and central inner shell 213 are stabilized/supported via vertical central member 205. The central member is, in turn, supported by frame 204.

In the illustrative embodiment, core 214 is disposed in molding region 212. The core material, which in the illustrative embodiment is available as a plurality of plank-like segments, forms a cylindrical shape or ring when assembled and positioned in molding region 212. This core ring (cylindrical or otherwise) establishes the basic shape for the workpiece being produced in molding region 212. As depicted in FIG. 2, fabric 210 is disposed on both sides of core 214 in preparation for fabricating a workpiece. More particularly, fabric 210A is disposed between core 214 and the outer circumference of molding region 212 and fabric 210B is disposed between core 214 and the inner circumference of molding region 212. As described in further detail later in this specification, the process proceeds by compacting fabric 210 on both sides of core 214 against the core, infusing the fabric with resin, and then curing the resin.

In the illustrative embodiment, core 214 is lowered into molding region 212 via overhead traveling crane 203. In some embodiments, the core comprises hollow planks produced from fiber and polymer via a pultrusion process, familiar to those skilled in the art and commercially available at a cost per pound which is generally low compared to other methods of fabricating linear composite shapes, from pultruders such as Glasforms and Strongwell. In conjunction with this specification, those skilled in the art will be able to select other processes to produce a structure suitable for use as core 214. In some other embodiments, the core can be produced from other materials (e.g., aluminum, etc.) and exhibit other structural arrangements (e.g., foam, sealed honeycomb internal arrangement, etc.).

Figure 4:
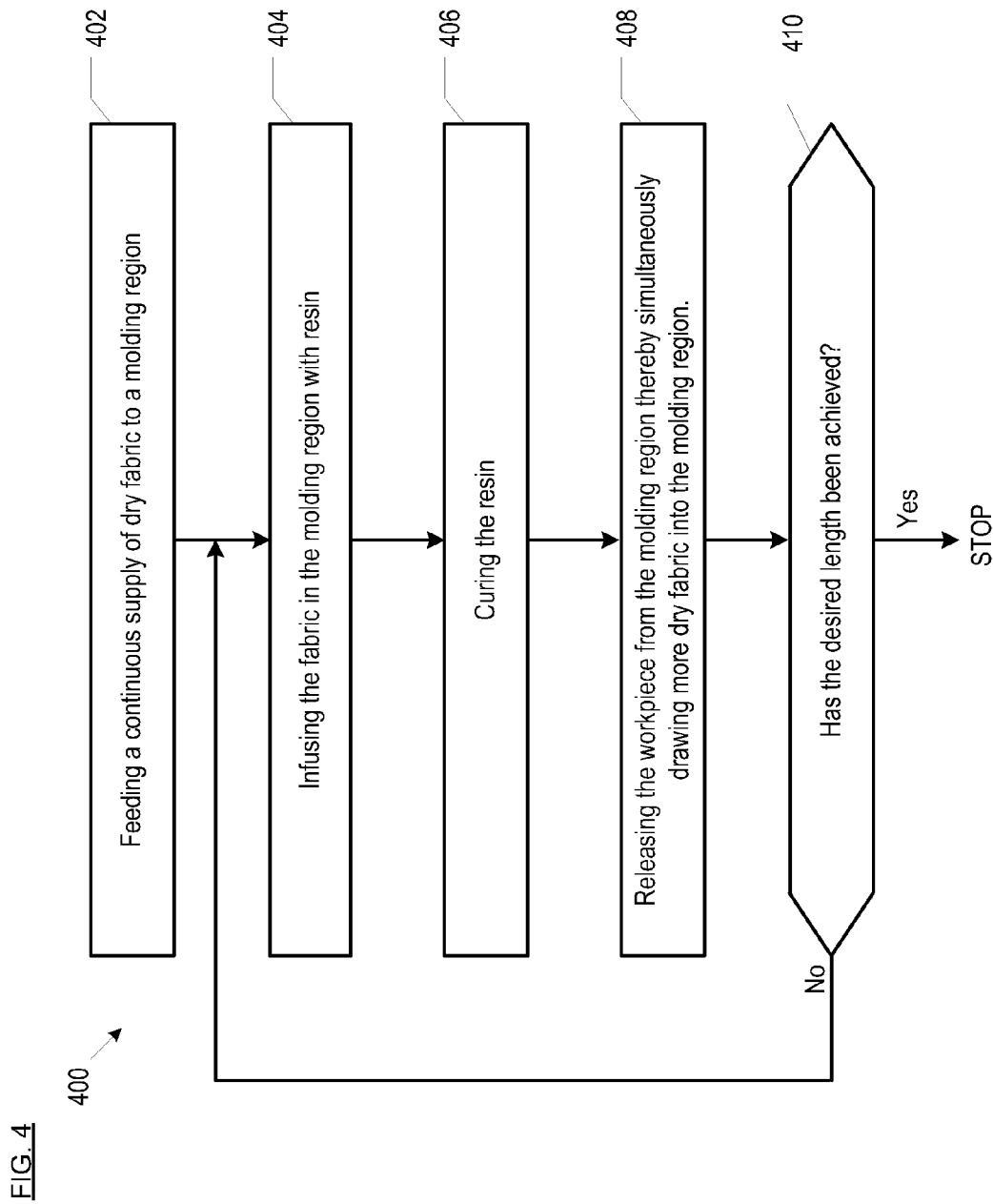
FIG. 4 depicts a method for making a multi-shot, continuous-fiber composite article in accordance with the illustrative embodiment of the present invention.

FIGS. 3A through 3E depict an overview of the manner in which a multi-shot, continuous-fiber article, such as a cold water pipe for an OTEC plant, is fabricated using apparatus 200. FIG. 4 depicts a block flow diagram of method 400 for fabricating a multi-shot, continuous-fiber article in accordance with the illustrative embodiment of the present invention.

Referring now to FIG. 4 and FIGS. 3A-3E, operation 402 of method 400 recites feeding a continuous supply of dry fabric to a molding region. This is depicted in FIG. 3A, wherein fabric 210 from rolls 208 extends into molding region 212. Continuity of fiber is maintained between fabric 210 on the rolls and fabric 210 in the molding region.

Assembly 316 is attached to the bottom end of the core (not depicted; see FIG. 2) in embodiments that use a core. Assembly 316 can serve one of several purposes. Assembly 316 can add "clump" weight to the cold water pipe, wherein this added weight limits horizontal travel of the suspended cold water pipe under the influence of ocean currents. In some embodiments, assembly 316 is used to hold a screen (if it is placed at the bottom of the cold water pipe) to filter the water that enters the pipe. Such screening is commonly used to keep large marine organisms out of pipes, etc., that feed to machinery.

Operation 404 of method 400 recites infusing the fabric in the molding region with resin and operation 406 recites curing the resin. Resin is added to the fabric in molding region 212 and then cured to form workpiece 318, as depicted in FIG. 3B. Further details of the resin-infusion operation and curing operation are provided later in this specification.

Operation 408 of method 400 recites releasing the workpiece from the molding region, thereby simultaneously drawing more fabric into the molding region. FIG. 3C depicts workpiece 318 released from molding region 212 and extending vertically downward into the ocean. As workpiece 318 moves downward into the ocean (under the control of a workpiece gripping and translating mechanism, which is not shown), additional fabric 210 is drawn from rolls 208 down into molding region 212. This occurs because there is continuity of fiber (as shown in FIG. 3B) between fabric 210 on the rolls and workpiece 318.

In operation 410, query whether or not the desired length of the article being fabricated has been reached. If not, processing returns to operation 404, wherein the process is repeated by adding resin to fabric that was drawn into the molding region (when the workpiece was released). In the present illustration, the length of the nascent cold water pipe, as achieved as of FIG. 3C, is evaluated and determined to be insufficient such that fabrication must be continued. A second shot of resin is therefore added to molding region 212 and then cured to produce workpiece 320, as depicted in FIG. 3D. Continuity of fiber is maintained between workpiece 318, workpiece 320, and fabric 210 on rolls 208.

FIG. 3E depicts workpiece 320 released from molding region 212 and extending vertically downward into the ocean. The boundary between the fabric in workpiece 318 and that in workpiece 320 is seamless; continuity is maintained as if the face sheets of both workpieces were formed together in a single shot. In the manner previously discussed, as workpiece 320 moves downward into the ocean, additional fabric 210 is drawn from rolls 208 down into molding region 212.

Method 400 is repeated, shot-by-shot, until the desired length of the pipe, etc., has been achieved.

Figure 5:
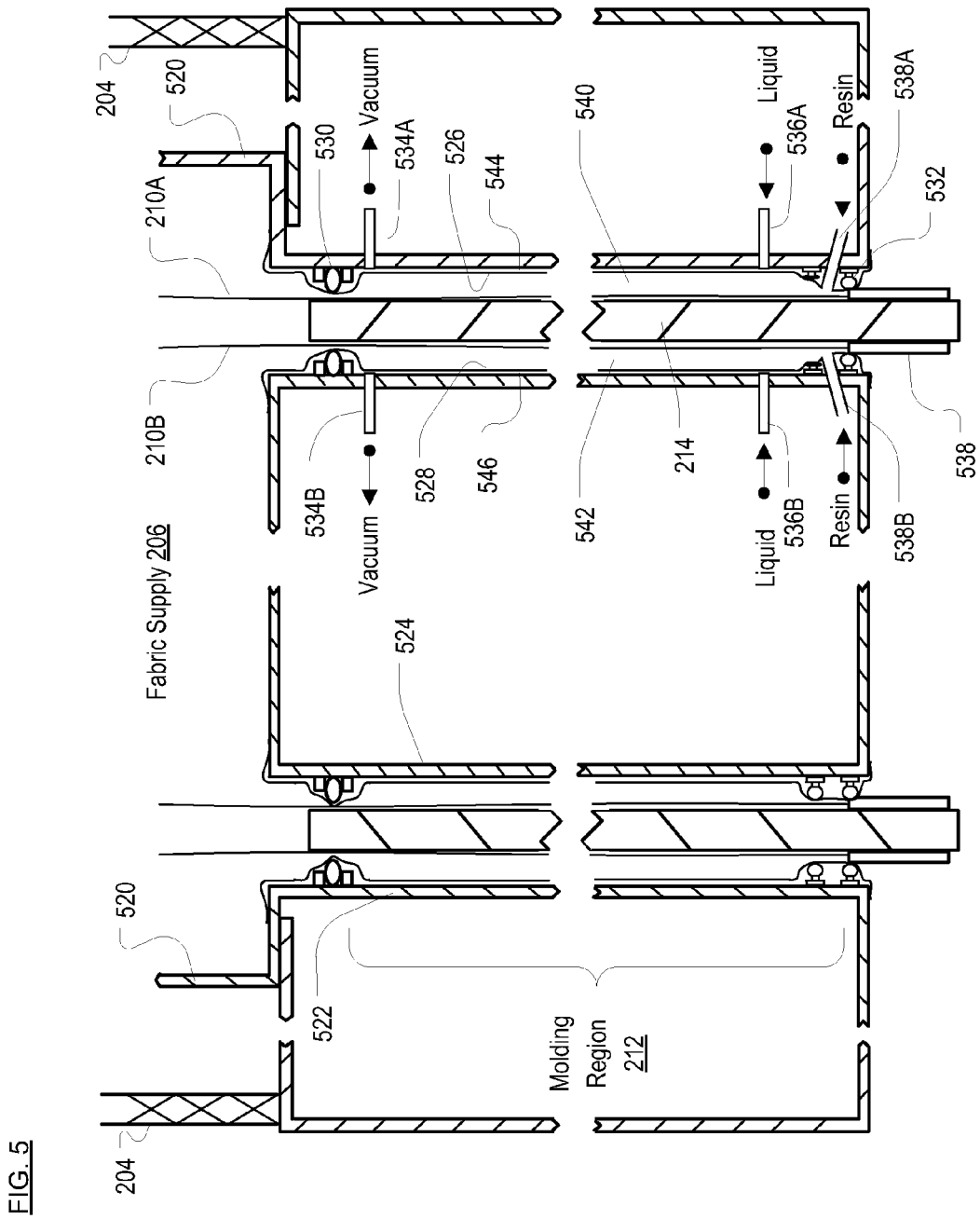
FIG. 5 depicts, via a side cross-sectional view, further detail of the apparatus of FIG. 2.
Figure 6:
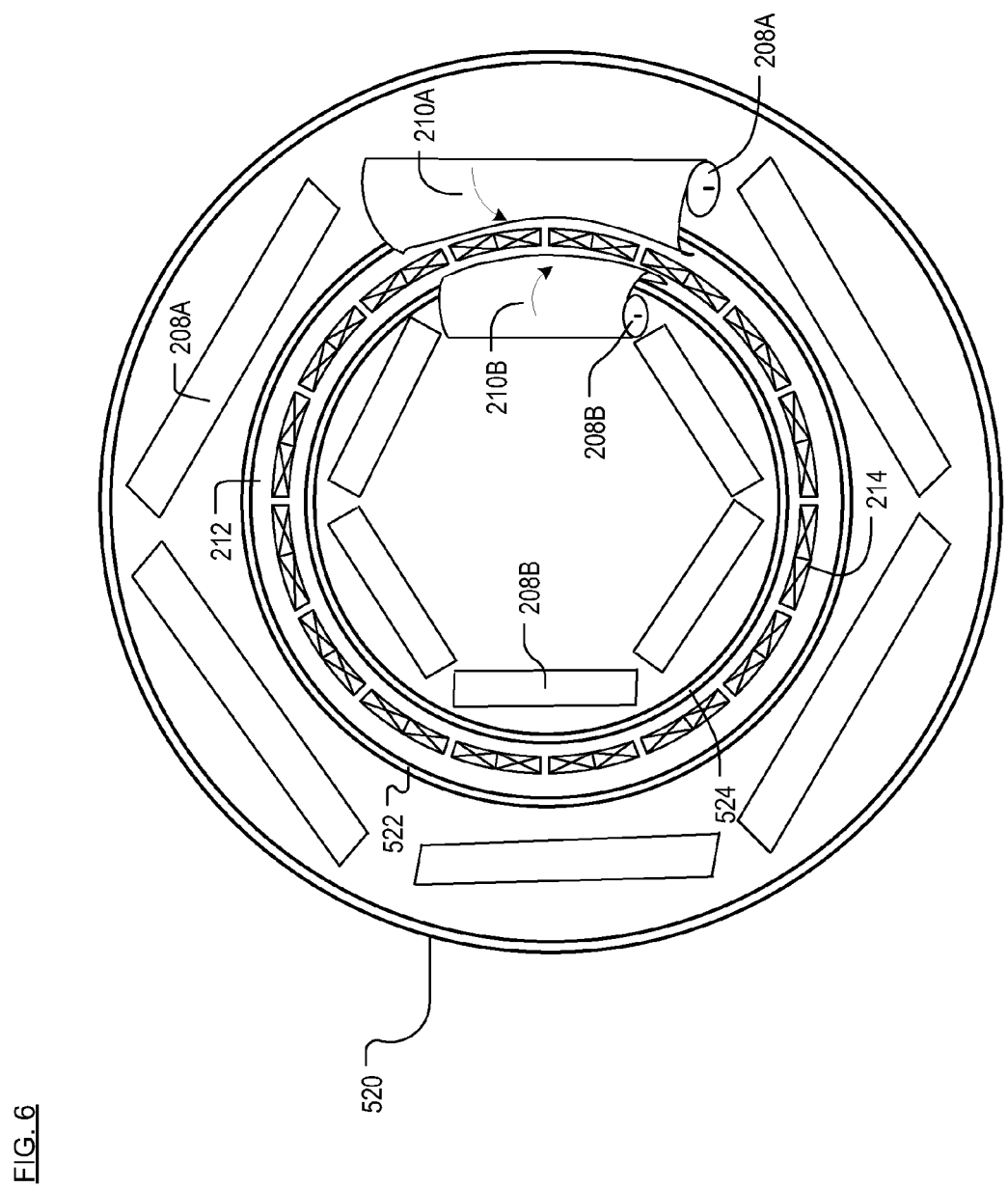
FIG. 6 depicts rolls of fabric that are disposed in the apparatus of FIG. 2 and which are used to form continuous-fiber composite articles using the apparatus of FIG. 2.
Figure 7:
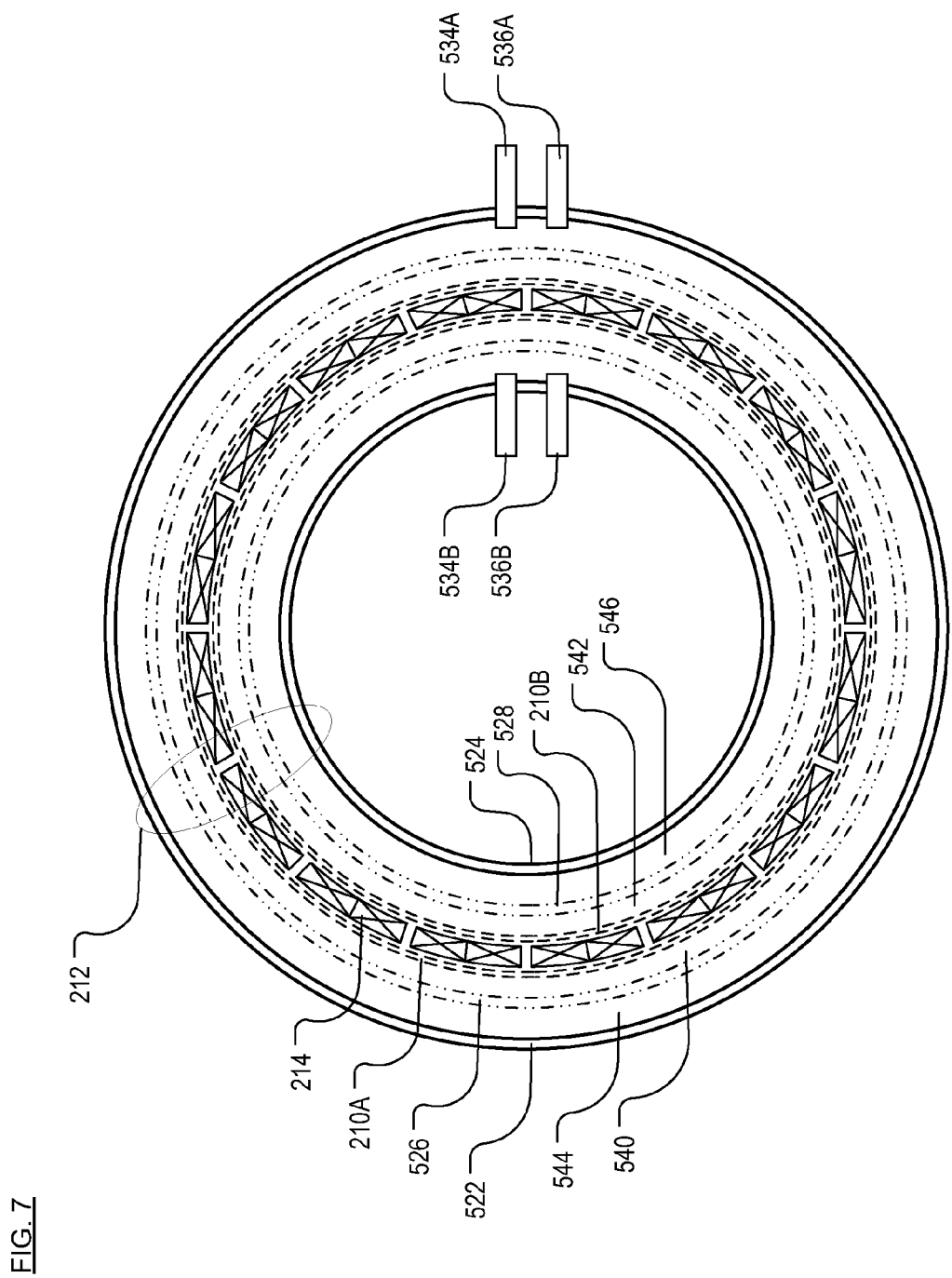
FIG. 7 depicts, via a top cross-sectional view, a cross section through the molding region of the apparatus of FIG. 2.

FIGS. 5, 6, and 7 depict further detail of apparatus 200. FIG. 5 depicts a side cross-sectional view of apparatus 200, FIG. 6 depicts a top view of fabric supply region 206 of apparatus 200, and FIG. 7 depicts a top cross-sectional view of molding region 212 of apparatus 200.

Referring now to FIG. 5, molding region 212 of apparatus 200 is defined between hard outer wall 522 and hard inner wall 524. The upper end of molding region 212 is delimited by core positioner 530 and the lower end of molding region 212 is delimited by seal 532. Core positioner 530 fixes the plural planks of core 214 in position (e.g., to define a cylindrical shape, etc.) within molding region 212. It is notable that core positioner 530 is not a seal.

Within molding region 212 is outer soft tool 526 and inner soft tool 528. Both the inner and outer soft tools are made of a resilient material that releases easily from cured composite articles, such as silicone rubber or the like. Liquid line 536A and vacuum line 534A are in fluidic communication with region 544 defined between hard outer wall 522 and outer soft tool 526. Similarly, liquid line 536B and vacuum line 534B are in fluidic communication with region 546 defined between hard inner wall 524 and inner soft tool 528. (See also, FIG. 7.)

Resin inlet line 538A is a tube, etc., that is in fluidic communication with region 540 between outer soft tool 526 and core 214. In the same manner, resin inlet line 538B is a tube, etc., that is in fluidic communication with region 542 between inner soft tool 528 and core 214. As described in further detail later in this specification, resin is delivered to molding region 212 via the resin inlet lines. Resin inlet lines 538A and 538B penetrate respective hard walls 522 and 524 and respective soft tools 526 and 538. The end of each resin inlet line that is attached to the soft tool advantageously moves with the soft tool. Yet, a fluid seal must be maintained where the resin inlet lines penetrate the hard walls. In some embodiments, this is achieved by helically orienting resin inlet lines 538A and 538B. After reading this disclosure, those skilled in the art will be capable of developing other mechanisms/arrangements/devices for accomplishing this purpose. Although shown for clarity as a single inlet 538A through outer wall 522 and a single inlet 538B through inner wall 524, in preferred embodiments, there are multiple instances of each of these resin inlet lines. In some embodiments, however, there is only a single resin inlet line 538A and a single resin inlet line 538B.

Wall 520 is disposed radially outward of molding region 212. Wall 520 extends upward defining fabric supply region 206, in which plural rolls 208A of fabric 210A and plural rolls 208B of fabric 210B reside (rolls not depicted in FIG. 5; see FIG. 6).

As previously noted, core positioner 530 is not a seal and, as such, fabric supply region 206 is in fluid communication with molding region 212. Fabric supply region 206 is configured so that is sealable at its upper end (upper end and seal not depicted in FIG. 5; see notional closure/seal 207 in FIG. 2). In conjunction with seal 532 at the bottom of molding region 212, fabric supply region 206 and fluidically communicating regions 540 and 542 can be placed under vacuum.

Fabric 210A fed from rolls 208A is disposed between core 214 and outer soft tool 526. Fabric 210B fed from rolls 208B is disposed between core 214 and inner soft tool 528.

Referring now to FIG. 6, plural rolls 208A and 208B of fiber are depicted in fiber supply region 206, the outer boundary of which is defined by wall 520 (see also FIG. 5). As previously discussed, in the illustrative embodiment, fiber supply region 206 is disposed above molding region 212, which is defined between outer wall 522 and inner wall 524. In the illustrative embodiment, six rolls 208A are disposed above and radially-outward of outer wall 522. Six rolls 208B are disposed above and radially-inward of inner wall 524. Fabric 210A from each of the rolls 208A is positioned within molding region 212 between outer wall 522 and core 214. Fabric 210B from each of the rolls 208B is positioned within molding region 212 between inner wall 524 and core 214. For clarity, FIG. 6 depicts fabric from only one roll 208A and one roll 208B extending into molding region 212.

For clarity, FIG. 6 depicts only one set of rolls 208A forming the outer face sheet and one set of rolls 208 forming the inner face sheet. In some embodiments, two sets of rolls are used for each face sheet.

In the embodiment that is depicted in FIG. 6, there are six fabric rolls 208B, all in the same horizontal plane. In some other embodiments, all fabric rolls are not in the same plane. For example, in some embodiments, fabric rolls 208B are divided (typically in even amount) into sets that are in two different horizontal planes, one above the other, wherein one set of rolls 208B is "clocked" or offset at 60 degrees relative to the other set. When clocked in such a manner, the seams between the individual fabric rolls of one set fall directly adjacent to continuous fabric in the middle of the rolls of the other set. As a consequence, when the laminate cures, the continuous fabric immediately adjacent to the seams transfers load across the seams, by "shear transfer." This type of arrangement makes it easier to develop overlap splices and provide additional shear transfer between the edges of adjacent rolls of fabric. By this well-known practice of distributing fabric splices in a composite laminate, the face sheets have the same mechanical properties in the circumferential direction as if they were made of fabric which is entirely continuous in the circumferential direction. Combined with the fact that the fabric is continuous in the longitudinal direction, the face sheets act as if they are entirely continuous throughout the entire cold water pipe, conferring substantial advantages as previously described in this specification.

The width of rolls 208A and 208B is selected as a function of the size (e.g., diameter, etc.) of the article being molded, so as to provide adequate circumferential coverage. As a consequence, for any given size article, a relatively greater number or lesser number of rolls can be used to provide a relatively greater amount or lesser amount of fabric coverage of core 214. In some embodiments, rolls 208B are narrower in width than rolls 208A, reflecting the larger circumference circumscribed by rolls 208A.

FIG. 7 depicts a top cross-sectional view of molding region 212. As depicted in FIG. 7, outer soft tool 526 and inner soft tool 528 are disposed in molding region 212. Outer soft tool 526 is disposed between hard outer wall 522 and core 214. Fabric 210A is disposed between outer soft tool 526 and core 214. Similarly, inner soft tool 528 is disposed between hard inner wall 524 and core 214. Fabric 210B is disposed between inner soft tool 528 and core 214. Liquid lines 536A and 536B and vacuum lines 534A and 534B, previously described, are also depicted in FIG. 7.

FIGS. 8A through 8E depict the formation of a workpiece-a section of a multi-shot, continuous-fiber composite article—via apparatus 200 and in accordance with method 400. These Figures do not depict the full cross section (as shown in FIG. 5); rather, they depict only the "right" side of FIG. 5, since the same processes are occurring at all circumferential locations throughout molding region 212 at any given time.

FIG. 8A depicts fabric 210A and 210B, as well as core 214, being drawn into molding region 212. To facilitate this operation, vacuum is pulled in regions 544 and 546 behind respective outer and inner soft tools 526 and 528. As is typical for vacuum-assisted resin transfer molding (the current method incorporates VARTM techniques), a "resin distribution material" (not depicted) is drawn, along with fabric 210A and 210B, into molding region 212. The resin distribution material facilitates quick spreading of the resin over the full extent of fabric 210A and 210B in molding region 212. An example of a suitable resin distribution material is EnkaFusion® brand flow medium available from Colbond-USA, of Enka, N.C. As an alternative to using a resin distribution material, grooves can be provided in the surface of core 214.

Referring now to FIG. 8b, after fabric 210A and 210B, the optional resin distribution medium, and core 214 extend fully into molding region 212, air is evacuated from fabric 210A and 210B in the molding region, thereby reducing, to the extent possible, the void content of the resulting workpiece. In the illustrative embodiment, fabric on fabric rolls 208A and 208B in fabric supply region 206 is not isolated (fluidically) from the fabric in molding region 212. As a consequence, by simply pulling a vacuum on fabric supply region 206, as illustrated figuratively in FIG. 8B, air is evacuated from all fabric that is above lower seal 532 (regions 540 and 542 on the core side of respective soft tools 526 and 528 are exposed to vacuum as well as fabric supply region 206).

After evacuating air, fabric 210A and 210B (as well as the resin distribution medium) in molding region 212 are compacted against core 214, as depicted in FIG. 8C. This is accomplished by exerting pressure behind outer soft tool 526 and inner soft tool 528. In the illustrative embodiment, the pressure is exerted by introducing a liquid, such as water, into regions 544 and 546 behind respective outer and inner soft tools 526 and 528. In some other embodiments, a gas can be used rather than a liquid. In the illustrative embodiment, liquid is delivered through liquid lines 536A and 536B.

In some other embodiments, liquid can be fed to regions 544 and 546 from a reservoir (not depicted) located at an elevation that is lower than molding region 212. Liquid can be drawn from or returned to the reservoir by simply altering pressure in regions 544 and 546. In other words, to draw liquid into regions 544 and 546 up from the reservoir, regions 544 and 546 are placed under vacuum and valves in lines 536A and 536B are opened. To retain the liquid, these valves are closed. Conversely, by releasing the vacuum in regions 540 and 542 and opening the valves, liquid can be returned to the reservoir by gravity.

Figure 8F:
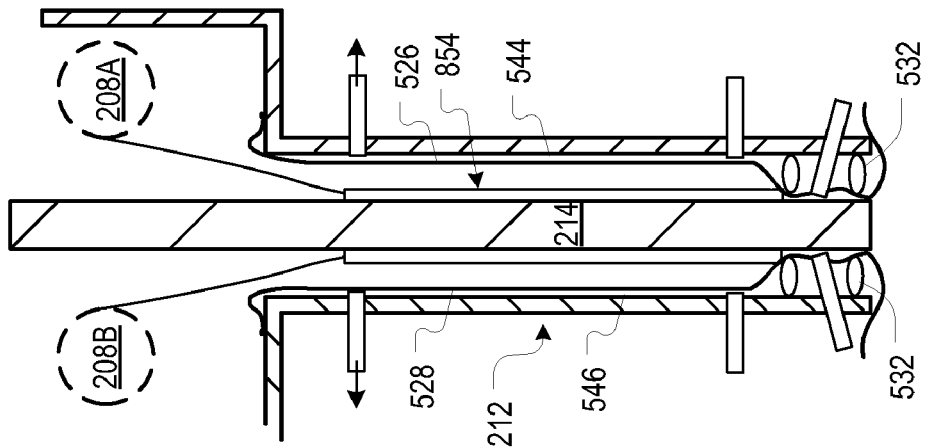
Figure 8E:
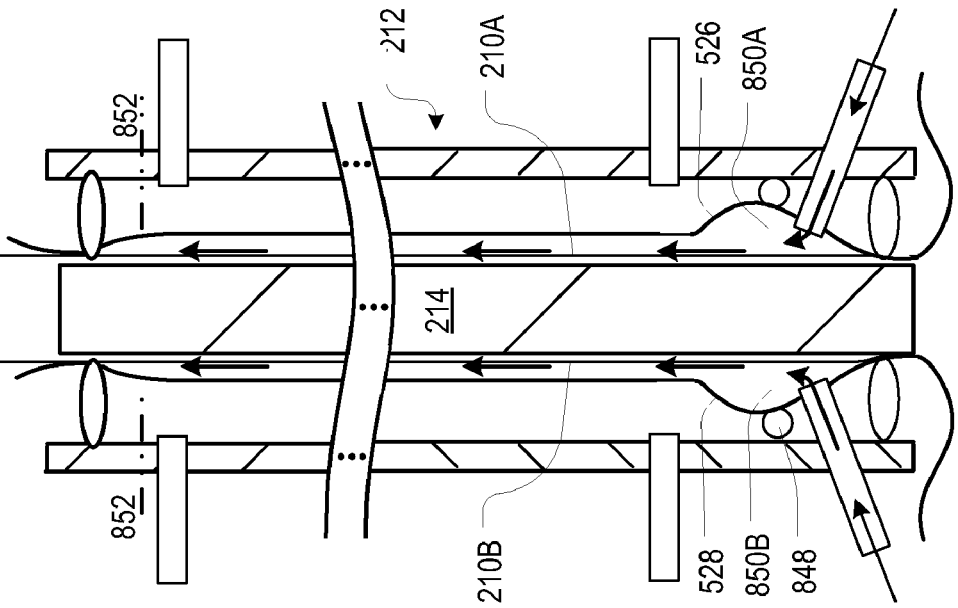
Figure 8D:
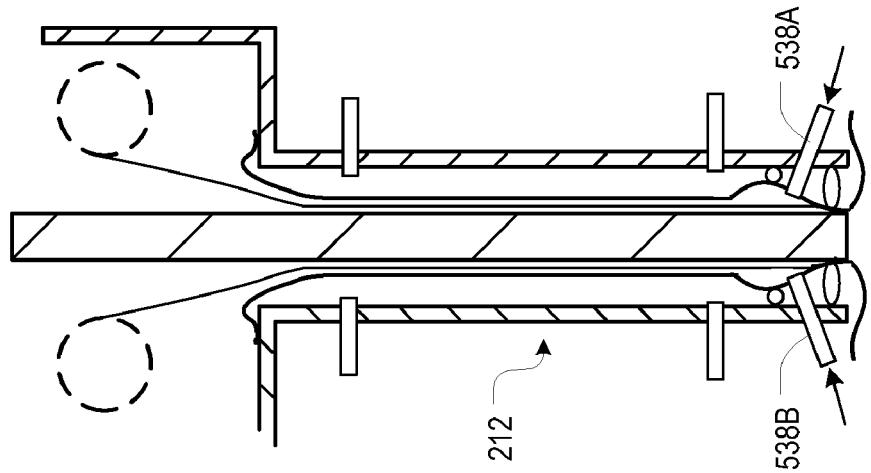

As depicted in FIG. 8D, resin is introduced along the bottom of molding region 212 via resin inlet lines 538A and 538B. Typically, a metering-mixing pump (not depicted) that combines catalyst and resin in correct proportion supplies the resin to the inlet lines. Commonly used low-viscosity resins suitable for VARTM and for use herein include polyester, vinyl ester, epoxy, phenolic, polyimide, and polyamide. Those skilled in the art will know how to suitably select a resin as a function of the article that is being produced.

FIG. 8E depicts further detail of the resin infusion process. To facilitate delivery of the resin, those portions of soft tools 526 and 528 near resin inlet lines 538A and 538B are drawn away from core 214. This can be accomplished, for example, using circular tubular vacuum actuator 848 placed between soft tools 526 and 528 and hard surfaces 522 and 524. This creates passages 850A and 850B near the outlet of respective resin inlet lines 538A and 538B for receiving resin and distributing it around the circumference of the workpiece with a re-usable apparatus. With pressure still being exerted behind soft tools 526 and 528, and with fabric 210A and 210B still under vacuum, the resin infuses the fabric, rising toward the top of molding region 212. The amount of resin introduced into the molding region is controlled so that the flow front (i.e., the upper resin level in the fabric) stops below level 852, so that the resin remains in a region where compaction pressure is being applied by soft tools 526 and 528. In this manner, geometry of the workpiece being formed is controlled everywhere within molding region 212.

In preferred embodiments, resin inlet lines 538A and 538B and nearby resin distribution regions 850A and 850B are disposed at the bottom of molding region 212. This causes the fabric in the workpiece to fill with resin from the bottom. As a consequence, the resin flow front (i.e., the point of furthest advance of the resin at any point during the shot) is always at the top of the just-wetted region and closest to line(s) through which the vacuum is drawn. This is advantageous because even though a vacuum is drawn on dry fabric 210A and 210B before infusion of the resin, there is always residual air left in the fabric. When the resin wets out fabric 210A and 210B, this residual air is displaced and forms air bubbles. Since these air bubbles have a much lower density than the resin, they rise in the liquid resin. With the resin flow front in good fluidic communication with vacuum line(s), the air bubbles easily rise to the flow front and are pulled out from the workpiece (by the vacuum). This helps ensure that the resulting workpiece has very low void content.

When the resin has filled the workpiece to the desired point (for each fabric 210A and 210B), a valve (see, e.g., FIG. 9) in respective resin inlet lines 538A,538B is closed. The vacuum applied to the fabric pulls the excess resin out of corresponding resin distribution passages 850A, 850B, and the portion of the soft tools that formed resin distribution passages collapses onto the workpiece. These resin distribution passages, which are simply portions of the soft tools, release from the resin after cure, and are therefore fully re-usable without replacement. This is a distinct advantage over the resin distribution lines serving the same function and ordinarily used with VARTM. Those conventionally used resin distribution lines maintain their shape during the resin curing process and resin left within those lines cures. As a consequence, these conventional resin distribution lines require either cleaning or disposal after each run.

Compaction pressure is maintained behind soft tools 526 and 528 while the resin cures. This compaction pressure pushes through the soft tools and onto the fabric of the workpiece, thereby compacting the fabric to produce a composite laminate with a controlled and desired fiber volume fraction. The source of this compaction pressure is the fluid that was previously introduced into cavities 544 and 546. By selecting a fluid whose liquid density nearly matches the density of the liquid resin, a uniform compaction pressure is maintained everywhere in the workpiece (top to bottom). For example, a 6% sugar/water solution has the same density as Derakane® 8084 resin (Ashland, Inc). And uniform compaction pressure can be maintained even for workpieces that are very tall; that is, in excess of 15 feet. This occurs because the vertical hydrostatic pressure gradient in the compacting fluid matches the hydrostatic pressure gradient in the liquid resin.

Figure 9:
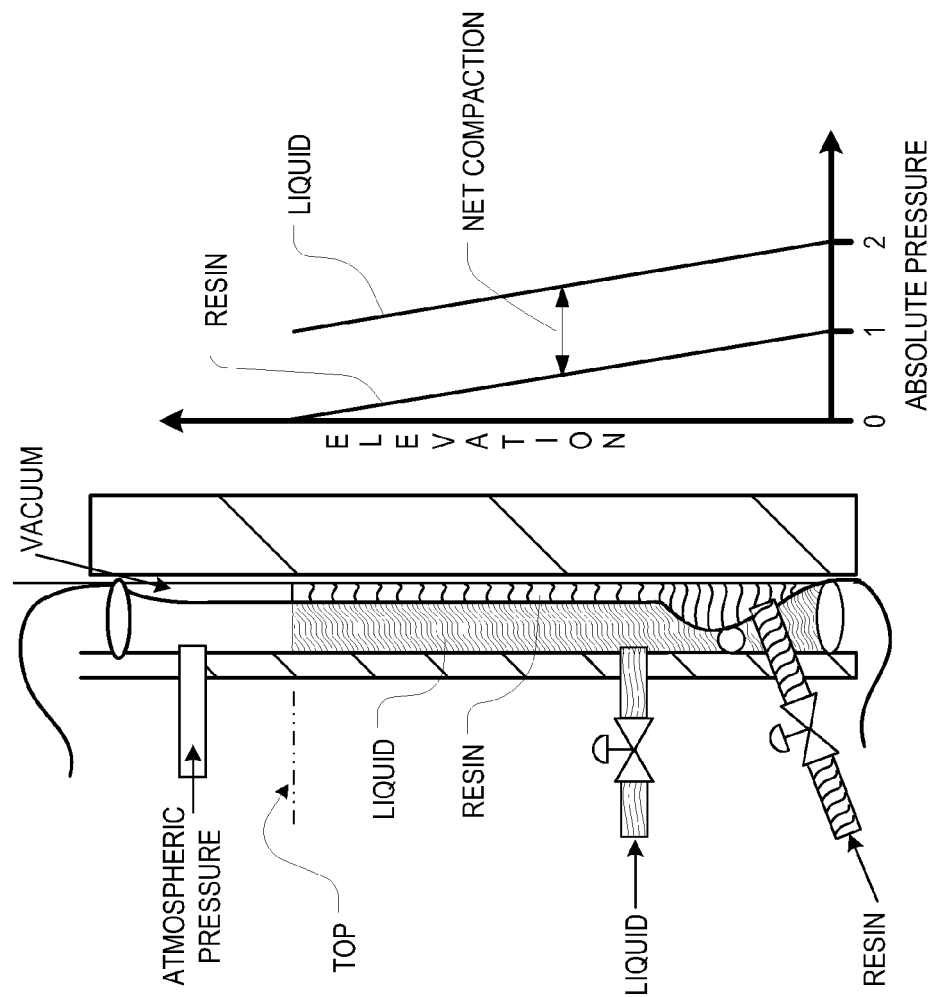
FIG. 9 depicts the use of liquid behind a soft tool in the molding region to create a constant compaction pressure.

Referring to FIG. 9, the net compaction pressure on the fabric from the soft tool is the difference between the pressure of the resin and the pressure of the liquid behind the soft tools at any given elevation. Therefore, by making these two gradients equal as depicted in FIG. 9, the compaction pressure is constant everywhere. For example, as depicted in FIG. 9, if full vacuum is pulled inside the fiber supply region 206 enclosing the fabric rolls and in regions 540 and 542 (such that the pressure at resin flow front is zero atmospheres absolute) and if the pressure at the top of each of liquid-filled cavities 544 and 546 is atmospheric pressure, there will be uniform compaction pressure of one atmosphere everywhere. This is of considerable advantage for producing a high and uniform fiber volume fraction everywhere in the face sheets in a tall workpiece. It is notable that pressure at the top of liquid-filled cavities 544 and 546 can be any pressure that is greater than the pressure (vacuum or partial vacuum) in regions 540 and 542. The choice of pressure is simply a matter of selecting a desired compaction pressure, which is within the capabilities of those skilled in the art.

After the resin cures to a self-supporting solid, as depicted in FIG. 8F, the pressure behind the soft tools is released. Soft tools 526 and 528 are withdrawn from curing workpiece 854 by applying vacuum to regions 544 and 546. Either before or after the soft tools are released, workpiece 854 is post cured. For example, in some embodiments, this is done before release by heating and circulating the same liquid that is used to pressurize regions 544 and 546 behind the soft tools. In some other embodiments, post curing is performed after release by circulating hot air between the workpiece and the soft tools.

After the workpiece is fully cured, lower seals 532 and the brakes that hold fabric rolls 208A and 208B stationary are released. This enables workpiece 854 to be lowered out of molding region 212. Because there is continuity of fiber between workpiece 854 and fabric still on rolls 208A and 208B, as the workpiece is lowered, additional fabric is drawn into molding region 212. The next core 214 is inserted into molding region 212 at the same time as the additional fabric. The molding of another workpiece is then ready to begin.

It will be appreciated that, by virtue of this method, each workpiece being produced exhibits continuity of (face sheet) fiber with all other workpieces of the multi-shot composite article being formed.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A vacuum-assisted resin transfer molding method for forming a continuous-fiber composite article via a multi-shot, batch process, wherein the method comprises:
   feeding a fabric to a molding region, wherein continuity of fiber is maintained between a supply of the fabric and the fed fabric;
   infusing the fed fabric with resin, wherein during infusion, the fed fabric is placed under vacuum;
   curing the resin to form a workpiece; and
   releasing the workpiece from the molding region, which, due to the continuity of fiber, causes additional fabric to feed to the molding region from the supply thereof.

2. The method of claim 1 further comprising disposing a discrete length of a core material into the molding region.

3. The method of claim 2 further comprising forcing the fabric in the molding region against the core material.

4. The method of claim 3 wherein the operation of forcing further comprises exerting pressure behind a soft tool that is disposed in the molding region.

5. The method of claim 3 wherein the operation of forcing further comprises delivering a liquid behind a soft tool that is disposed in the molding region.

6. The method of claim 3 wherein the operation of forcing further comprises delivering a liquid behind a soft tool that is disposed in the molding region, wherein the liquid has a density that is substantially the same as the density of the resin.

7. The method of claim 1 wherein the operation of infusing the fed fabric further comprises placing the supply of fabric under vacuum.

8. The method of claim 1 wherein the operation of infusing the fed fabric further comprises introducing resin from a bottom of the molding region.

9. The method of claim 8 wherein the operation of infusing the fed fabric further comprises forming a resin distribution passage proximal to a region at which resin is introduced to the molding region, wherein the resin distribution passage enables resin to flow around the circumference of the fed fabric.

10. The method of claim 9 wherein the operation of forming a resin distribution passage further comprises drawing a soft tool away from a core material that is disposed in the molding region.

11. The method of claim 10 wherein the operation of drawing the soft tool away from the core material comprises creating a vacuum behind a region of the soft tool.

12. The method of claim 1 further comprising performing the method at a site at which the continuous-fiber composite article is to be used.

13. The method of claim 12 wherein the operation of releasing the workpiece further comprises releasing the workpiece into a body of water.

14. The method of claim 13 wherein the article is a cold water pipe for an ocean thermal energy conversion plant.

15. The method of claim 1 further comprising repeating the operations of feeding, infusing, curing, and releasing a plurality of times to produce a plurality of workpieces, each of which workpieces exhibit continuity of fiber with one another.

16. A vacuum-assisted resin transfer molding method for molding a continuous-fiber composite article, wherein the article is produced batchwise via a plurality of shots that form a plurality of workpieces across which continuity of fiber is maintained, wherein the method comprises:
   (i) feeding a fabric to a molding region, wherein continuity of fiber is maintained between a source of the fabric and the fabric fed to the molding region;
   (ii) infusing the fabric with resin under vacuum; and
   (iii) forming the workpiece by curing the resin.

17. The method of claim 16 wherein, for each shot, after the workpiece is formed, feeding additional fabric to the molding region by releasing the workpiece from the molding region.

* * * * *